(12) United States Patent
Lacey

(10) Patent No.: US 10,464,745 B2
(45) Date of Patent: Nov. 5, 2019

(54) MODULAR WASTE TRANSFER STATION (MWTS)

(71) Applicant: Brian Jason David Lacey, Greenacre, New South Wales (AU)

(72) Inventor: Grant Lacey, Brisbane (AU)

(*) Notice: Subject to any disclaimer, the term of this patent is extended or adjusted under 35 U.S.C. 154(b) by 0 days.

(21) Appl. No.: 15/526,015

(22) PCT Filed: Nov. 2, 2015

(86) PCT No.: PCT/AU2015/050688
§ 371 (c)(1),
(2) Date: May 11, 2017

(87) PCT Pub. No.: WO2016/074029
PCT Pub. Date: May 19, 2016

(65) Prior Publication Data
US 2017/0313506 A1 Nov. 2, 2017

(30) Foreign Application Priority Data
Nov. 14, 2014 (AU) ................................ 2014904578

(51) Int. Cl.
| | |
|---|---|
| *B65F 1/14* | (2006.01) |
| *B65F 1/10* | (2006.01) |
| *B65F 1/16* | (2006.01) |
| *B65F 1/02* | (2006.01) |
| *B65F 1/00* | (2006.01) |
| *B65F 1/12* | (2006.01) |

(52) U.S. Cl.
CPC .............. *B65F 1/10* (2013.01); *B65F 1/0033* (2013.01); *B65F 1/02* (2013.01); *B65F 1/1452* (2013.01); *B65F 1/16* (2013.01); *B65F 1/12* (2013.01); *B65F 1/1468* (2013.01); *B65F 2210/132* (2013.01); *Y02W 30/10* (2015.05)

(58) Field of Classification Search
CPC ......... B03B 9/06; B03B 9/061; B09B 3/0075; B65F 1/1426; B65F 1/02; B65F 1/033; B65F 1/10; B65F 1/12; B65F 1/16; B65F 1/1452; B65F 1/1468
USPC ........................................................ 209/930
See application file for complete search history.

(56) References Cited

U.S. PATENT DOCUMENTS

| | | | |
|---|---|---|---|
| 4,105,131 A | 8/1978 | Broderick | |
| 4,157,961 A * | 6/1979 | Borst | .................... B01D 33/04 210/768 |

(Continued)

FOREIGN PATENT DOCUMENTS

| | | |
|---|---|---|
| ES | 2369598 A1 | 12/2011 |
| FR | 2689039 A1 | 10/1993 |
| GB | 2393102 A | 3/2004 |

*Primary Examiner* — Joseph C Rodriguez
(74) *Attorney, Agent, or Firm* — Epstein Drangel LLP; Robert L. Epstein

(57) ABSTRACT

System and method of managing waste at waste transfer stations. Open faced bins allow human entry for sorting, segregation or quarantining waste before it is moved to or mixed with bulk waste stations. Bins are located in covered or uncovered bays located away from waste stations. Stops and guides for precise and safe placement of bins in bays are provided. Bins have quick hitch connection points. To collect, store and redirect leachates in bins, a liquid capture zone and drain hole is provided. Bay design prevents public access to machine areas and adjacent bays.

4 Claims, 4 Drawing Sheets

(56) References Cited

U.S. PATENT DOCUMENTS

| | | |
|---|---|---|
| 4,538,512 A | 9/1985 | Blough |
| 4,913,301 A | 4/1990 | Pickler |
| 5,638,747 A * | 6/1997 | Peng .................... B30B 9/3092 100/102 |
| 8,550,252 B2 * | 10/2013 | Borowski ............ B65F 1/0066 209/3 |
| 8,595,021 B2 * | 11/2013 | Mallett ................ B07C 5/3412 705/1.1 |
| 9,273,485 B2 * | 3/2016 | Goode .................... E04H 17/18 |
| 9,511,932 B2 * | 12/2016 | Curotto .................. B65F 1/122 |
| 9,573,758 B2 * | 2/2017 | Mullet .................... E05F 17/00 |
| 2004/0169038 A1 | 9/2004 | Pickler |
| 2005/0080520 A1 | 4/2005 | Kline et al. |
| 2006/0174433 A1 | 8/2006 | Schnettgoecke |
| 2008/0020456 A1 | 1/2008 | Choate et al. |
| 2010/0071149 A1 | 3/2010 | Rich |
| 2012/0067807 A1 | 3/2012 | Lappeman |
| 2018/0072496 A1 * | 3/2018 | Dall'Armi ............ B65F 1/0046 |

* cited by examiner

MODULAR WASTE TRANSFER STATION (MWTS)

FIELD OF THE INVENTION

The present invention relates to a system and method of managing refuse, particularly at a waste transfer station (WTS).

BACKGROUND OF THE INVENTION

Waste Transfer Stations (WTS) are an intermediate facility where waste can be delivered by various means and Users. Waste at a WTS can be inspected and sorted to varying degrees prior to being transferred to another location for treatment, reprocessing, recycling or landfill. The objective of the sorting is to provide diversion of waste and where practical:

1) Recycle or reuse extracted materials;
2) Segregate into Waste Types and
3) prevent materials that are hazardous, prohibited or toxic from entering the waste stream.

Regulations, compliance and environmental demands are putting even greater punitive, social and commercial pressures to:

1) maximize Reuse and Recycling to divert volume form landfill.
2) Improve safety at WTS.
3) Intercept and control problem and Hazardous waste that represent a public health risk and contaminate bulk waste storage.

Existing methods employed at WTS have struggled to improve in these areas as they were not part of their original design intent.

How a Waste Transfer Station Works?

Refuse is delivered to WTS by various entities including but not limited to commercial Operators, and the general public. Once the delivered waste material is sorted, it is loaded and often compacted into larger vehicles for direct delivery to it's another location for; reprocessing, recycling, reuse, treatment or landfill.

Generally there are three major types of systems employed in transfer stations today. Each WTS or local authority may describe these differently or may use a combination of these systems at any particular WTS site. These three methods are described as follows:

1) Push Pits are most commonly used particularly in larger scale WTS. Typically they involve substantial built structures and a main covered transfer area. The Users on these sites reverse their vehicle close to the pit and either tip the contents directly into the pit or throw the waste into the pit by hand. The pit is a common/multi user pit for bulk waste. A heavy machine, often a dozer or loader operates in the pit crushing the material and pushing it into a bulk bin located at the ends of the pit. Once the materials are in the pit it is no longer safe to inspect or recover materials for diversion or to extract prohibited materials. Diversion, segregation and compliance can only in the user area before depositing in the pit while on the Users vehicle providing little opportunity for the operator to manage the contents of an inbound load. Fees at WTS are typically governed by the type of waste. Users invariably do not declare wastes that incur a higher disposal charge, unless the operator stands over the user for the duration of their visit the Operators have little chance of policing and refuting the type of waste claimed by the user. As a result Operators potentially under charge or miss a fine or recovery cost to the user for dumping prohibited materials. To compound the inefficiencies of the system in terms of maximizing diversion, any contaminate added to the Pit by a user can result in the entire contents of the pit requiring quarantining and special treatment. Operators in particular are at risk from prohibited materials and how they react when being impacted with machinery, for example: rupturing chemical containers (Including Batteries), exploding Gas Bottles and generated Asbestos dust.

There are numerous recorded safety issues with this type transfer station primarily associated with manual handling by Users, falls into the pit/bin and operator activity in the pit.

2) Direct to Bulk Bins system usually provides a platform for a user that is elevated relative to the bulk bin that their waste is to be deposited into. This may be achieved by having a raised platform for the user or a lowered platform or pit for the bin. The user of these facilities usually picks up the materials by hand from their vehicle and then throws the waste into the bulk bin. Once the material is in the bin it is no longer safe to inspect or recover materials. Prohibited materials once in the bin are difficult to detect, if they are detected they render the entire contents of the bin contaminated. The same user safety and fees issues that are inherent in the Push Pit exist in Direct to Bulk Bins.

3) Flat floor transfer stations require the user to deposit their waste typically onto a common mound of waste on a floor. The waste is then sorted by Operators manually or by machine for bulkier items. This type of facility is inherently unsafe as public, Operators and machinery are co-mingling in the process and there is no containment of potentially hazardous materials. The labor intensive nature of the operation increases the potential for operator injury. Users are depositing their waste typically direct into a common waste pile if an operator is not watching the user it is difficult to attribute to any particular user to the types of waste including prohibited and Hazardous materials evident in the waste pile are. If prohibited materials are detected they render the entire contents of the Bulk Waste Stream contaminated impacting the operation and the capacity of the WTS. If the prohibited materials are chemicals, then there is limited potential to contain or quarantine. Similar user safety and fees issues that are inherent in the Push Pit and Direct to Bulk Bins exist with this method. Because of the safety issues inherent in this method it is less used today.

4) Various adaptation have been developed for the above methods, particularly for the more common push pit and direct to bin methods, in an effort to improve the effectiveness of the above methods. Some examples of such adaptations are:

1) Retractable floors over a Bulk Waste Bin or Pit have been trialed where waste is placed on the cover/floor for delivery and inspection, when retracted waste is allowed to fall into the pit or bin. The system is very costly, inherently susceptible to fault and highly reliant on procedural measures for safety. Diversion Operators need to work in the user space in order to recover any materials and any materials identified for diversion need to be moved around in the user area delaying the availability of the bay and reducing the capacity of the WTS. This puts Users, Operators, delivery vehicles and recovery machinery all in the same space, this in inherently unsafe. Prohibited or Toxic materials particularly chemicals are not contained by this system if they are identified the shutdown of a bay can be protracted while remediating.

2) Another alternative that has been employed is the use of Walking floors or conveyor system where Users deposit their waste directly to these systems. These systems are inherently dangerous as they are routinely moving the waste to a Pit or Bulk bin. Due to safety issues, waste delivered onto one of these systems cannot be accessed for sorting for diversion or recycling. These systems are capital intensive are susceptible to break down given the mechanical electrical nature of their operation. Deposited hazardous or contaminated materials can result in the entire facility being shut down until remediated. Fundamentally these systems are limited in achieving the objective of enhancing diversion, improving compliance or recycling.

3) Alternatively, a fixed mechanical tipping platform has been used to lift and tip the waste into a pit or bin directly behind the tipper bin. There are several different systems that have been trialed including waist height bins and flat bottom tray buckets. These systems allow for inspection before adding to the co-mingled waste stream however safety issues in the work area limit the potential to act on what is identified. To improve Diversion and recycling Operators are required to work in the user space to recover any materials. Any materials identified for diversion need to be moved through the user area. This puts Users, Operators, delivery vehicles and recovery machinery all in the same space, this in inherently unsafe. With regards to toxic dangerous or prohibited materials because of the fixed nature of the bin/tray quarantining the unit in order to remediate renders a portion of the facility inoperable diminishing the entire WTS's capacity. These systems are fixed, very costly, inherently susceptible to fault and highly reliant on procedural measures for safety as a result they have not gained broad acceptance. The need to do all the recovery work in the user space appreciably reduces the capacity of the plant as much more time is needed to address each bins potential before the next user can use the bay.

Waste transfer stations are a critical part of waste management today.

There are various solutions in the market as noted above in relation to the range of WTS solutions available to manage waste. It is apparent that the solutions that dominate the market are capital intensive, have numerous unresolved safety issues and provide substantial constraints on the ability for the operator to improve diversion and limit/control prohibited materials.

While attempts have been made to adapt existing facilities to improve compliance, safety and diversion, none have been wholly successful in addressing all of the identified issues significantly, either individually, as a sub-group or whole.

One other characteristic of existing technologies is that they tend to have a substantial portion of fixed constructed plant in order to make them work. None of the existing technologies are truly modular and re-locatable as the MWTS that is the subject of this invention.

SUMMARY OF THE INVENTION

In one aspect, the present invention provides a method for the operation of waste transfer stations where waste can be laid out, inspected and redirected for disposal or diversion before entering the bulk waste stream, comprising the steps of:

(i) laying out or displaying parcels of delivered waste for review and inspection on a structure where the structure complete with waste can be relocated for sorting, or directed to bulk waste by waste type;

(ii) conducting all waste delivery & sorting operations on the same ground level as a delivery vehicle;

(iii) reviewing and sorting for diversion is maximised by the ability to review a discreet quantity of displayed waste before mixing with bulk waste;

(iv) identifying, removing or quarantine of prohibited items is performed discreet from the bulk waste stream and where the prohibited materials are contained in a structure that can be easily relocated to an area away from the user zone;

(v) identifying and quarantine of prohibited items is performed prior to the material being added to the bulk waste stream limiting broad based contamination;

(vi) sorting waste for diversion of recoverable or reusable waste is conducted out of the user work area, in order to diminish the potential for harm to users and operators; and (vii) minimising amount of waste contaminated water (leachate) making contact with a waste transfer facility ground water system where mechanisms exist to divert or capture leachate and chemicals discreetly.

Preferably, the method includes segregating between the users and machinery areas and removing the requirement for resource recovery to be performed in the user area.

Preferably, Hazardous or Contaminated waste is:

(i) identified, contained and removed from the work area without an operator needing to make contact with the hazardous or contaminated material;

(ii) Contained in a discreet delivered amount of waste;

(iii) identified and quarantined before introduction to the bulk waste stream (bulk bin, pit, landfill or other form of bulk waste storage);

(iv) enclosed to contain the hazard; and relocating the bin complete with Hazardous material to a safe location for treatment by qualified persons.

In another aspect, the present invention provides a bin structure for collecting or depositing waste at a waste transfer station, the bin comprising:

(i) No front face to provide easy and safe access to allow a user or operator to enter the bin without a gate or trip hazard in order to place waste;

(ii) A bin designed and intended for a user or operator to work within the bin;

(iii) A quick pick up connection for machinery at a rear of the bin particularly but not limited too for Loaders, Dozers and Excavators so that the bin can be picked up and relocated quickly and efficiently by a machine operator without the operator exiting the machine;

(iv) An optional quick attaching closure for the open front face to allow the contents to be quarantined/contained;

(v) Impact absorbing stops that minimize contact impact with bays; and (vi) Substantially flat to ground step free bin base, minimising trip hazards.

Preferably, the bin structure without a front face provides for management of chemicals and leachate comprising:
  (i) A fluid capture area or bund to the base of the bin;
  (ii) A reservoir area to the bin that has barriers that reduces amount of solid waste entering the reservoir that may impede flow of fluids;
  (iii) A means to direct chemicals and leachate into the reservoir;
  (iv) A means to accurately release the chemicals or leachate from the bin reservoir into a designated containment vessel and
    leachate entering the ground water system of the site is mitigated by the system.

In another aspect, the present invention provides a system for waste management comprising a bin and bays wherein the bin works in unison with bays (Bump Bays and Shelta Bays) that:
  (i) Provide guides for the accurate and safe placement of the bins in the bays;
  (ii) Provide physical barriers between users and the machine areas;
  (iii) Provide physical barriers between bays to limit users ability to do harm into adjacent bays; and
  (iv) Provide restricted access for users into a bay without a Bin.

Preferably, the bin and bay provide a standalone solution and not a retrofit or included inside another building structure, and the modular bays provided can be equipped with an integrated roof structure (Shelta Bay), and comprise means to:
  (i) cover the bin to direct rainwater away from the bin, reducing the creation of leachate;
  (ii) provide shelter and or shade for users & operators;
  (iii) provide stops and guides that integrate with the bin;
  (iv) provide a supporting framework for a CCT monitoring system;
  (v) relocate easily in modular sections;
  (vi) add easily to or subtracting from the facility in order to meet changes in demand;
  (vii) provide an alternative to in situ fixed structures and
  (viii) is substantially assembled before delivery in order to reduce site establishment time and minimize construction risk.

Preferably, the bin and bay structure is a retrofit or included inside another building structure, where the system:
  (i) is installed with or without an integral roof structure (Shelta Bay)
  (ii) Comprises of bin and bays to change the method of managing waste in the facility where machine, sorting and user areas are segregated
  (iii) Falls from height are eliminated and
  (iv) Is substantially assembled before delivery in order to reduce site establishment time and minimize construction risk.

Preferably, the bays and the bin comprise of modular sections that can be added or removed with changes in demand without the need for substantive site reengineering, construction or deconstruction works.

Preferably, the system comprises an integrated signaling system that allows an inspecting operator to indicate to an unsighted machine operator the Bin is ready for collection and identify a relocation site.

Preferably, the system further comprises three distinct zones for operation and safety, Zone 1 for User, Zone 2 for Machinery Zone 3 for Diversion Operators. Preferably, the system further comprises quick hitch members adapted to attach to the rear of the MWTS bin.

Preferably, the quick hitch members are selected from the group consisting of Wheel & Skid steer Loaders, Excavators, Back Hoes, and Manitou.

DETAILED DESCRIPTION OF THE INVENTION

The present invention provides a system and method of managing waste, particularly but no exclusively at a waste transfer station.

There are two core product elements that complement the system:
1) The open faced bin or "L-Bin"
2) The bay either an uncovered "Bump Bay" or covered "SheltaBay".

The bay systems can be fitted to a simple concrete slab or can be self-supporting. This system can be manufactured in a range of sizes to suit various transfer station configurations. The number of bays is limited only to the available space on site.

The L-Bin is effectively a substantially flat based bin open on one side for Users to be able to enter to deposit waste. It is designed to be particularly robust, with a large capacity and quick hitch attachments for easy handling by machine Operators.

The floor of the L-Bin or receptacle is designed to minimize trip hazards with a maximum area to allow waste material to be laid down efficiently.

Stops and guides are provided to aid Operators in the precise and safe placement of the L-Bin in the bays.

The L-Bins are available in different colours to suit client preferences or the waste type for easy identification; eg green for green waste, red for toxic or hazardous material, etc.

Figure 1:
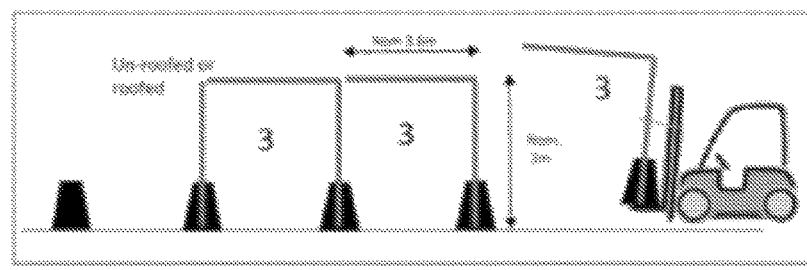
FIG. 1 shows a typical arrangement and assembly for a modular Bay solution including roofed SheltaBay and unroofed Bump Bays.

FIG. 1 shows a front view of a simple bay and Modular SheltaBay (3) arrangement with a forklift bringing in for placement the next modular SheltaBay.

Figure 2:
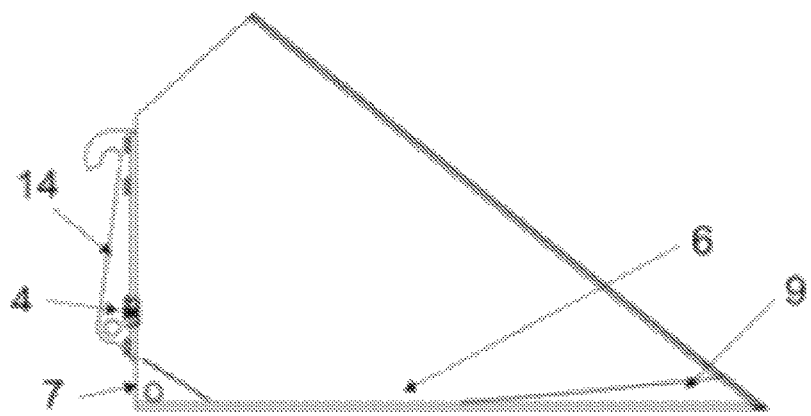
FIG. 2 shows a typical L-Bin side view.

FIG. 2 shows a typical sectional view of the L-bin and indicates the "Fluid Retention Lip" (9) that goes to creating the spill and waste water capture bund (6). A quick hitch connection point (14) at the rear of the L-Bin.

Located near the rear bottom of the L-Bin is a fluid capture zone and drain hole (7).

Figure 3:
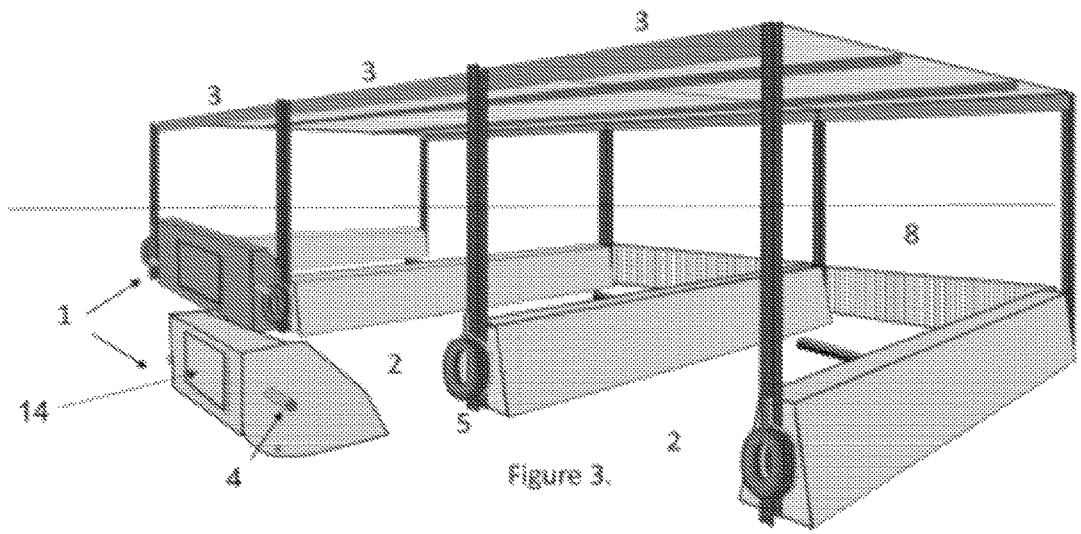
FIG. 3 shows the MWTS as a complete system as a new site (Not Retrofit). Including modular SheltaBay, and L-Bins.

FIG. 3 shows the system as an embodiment of the present invention comprising as seen from the machine Operator zone. The illustration indicates a flat concrete pad (2), L-bin (1) and modular SheltaBay (3). Access to an unloaded (no L-Bin) bay is restricted by a retractable/removable barrier (8). The Shelter Bay at the rear shows a tyre (5) as a typical indication of a bump stop. The L Bins are fitted with limiters and stops (4) to ensure correct placement of the bin and to prevent the public from entering the Machine area of the WTS. The limiters (4) prevent the L-Bin from pushing further into a bay towards the user area.

Figure 4:
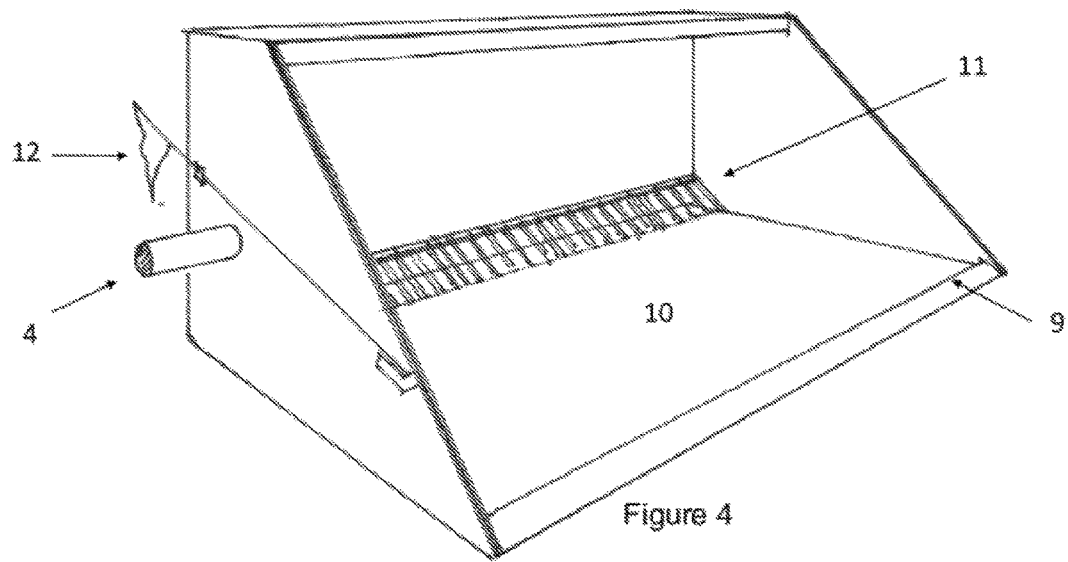
FIG. 4 shows the front view of a typical L-Bin as an embodiment of the present invention.

FIG. 4 Shows a front perspective view of the L-Bin. The Flat floor fluid capture reservoir (10), is facilitated by the fluid retention lip (9), and a hinged finger grate (11) helps to separate waste from fluids so that the drain point is more resistant to blockage by waste. (12) Indicates a signal system in this instance is by way of a coloured flag that is visible to the machine operator. The machine operator by the presence and colour of the flag knows firstly that the bin is ready to be moved and by colour where it is to be moved to. (4) indicates a type of limiter or stop that may be employed to prevent the L-Bin from being pressed by the machine into the operator area while also providing a barrier to prevent Users from getting around the bin into the machine area.

Figure 5:
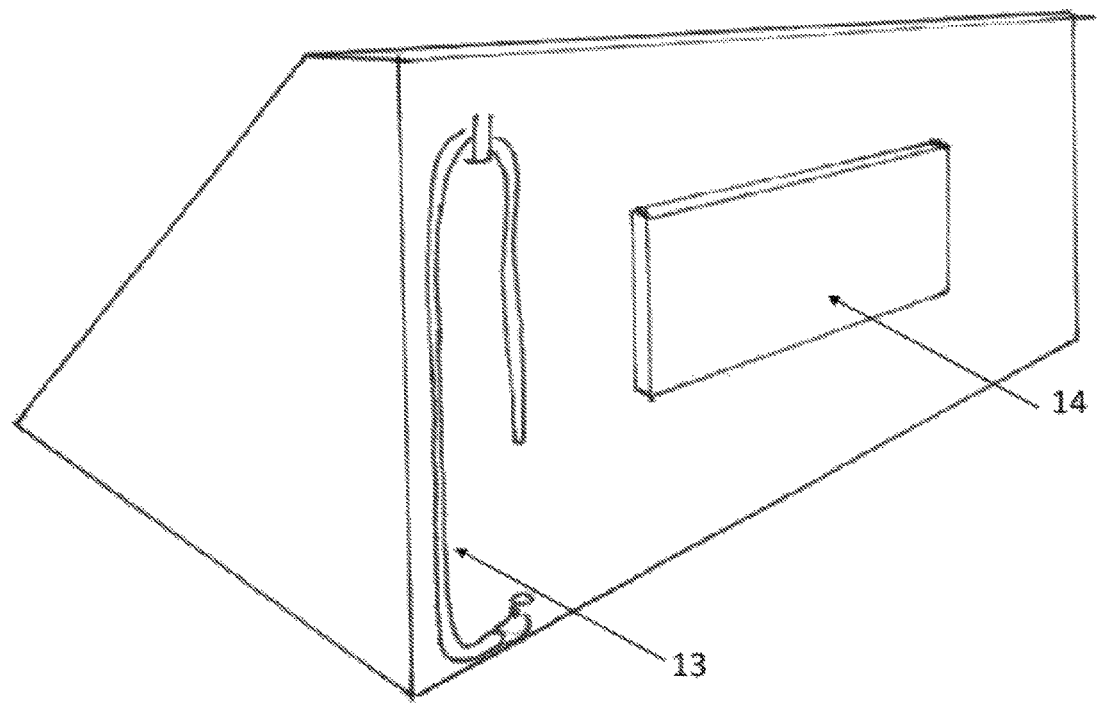
FIG. 5 shows the rear view of a typical L-Bin as an embodiment of the present invention.

FIG. 5 shows the rear view of the bin as an embodiment of the present invention comprising an optional contaminated liquid drain and tap (13) and a quick hitch connection point (14) for the nominated equipment.

Figure 6:
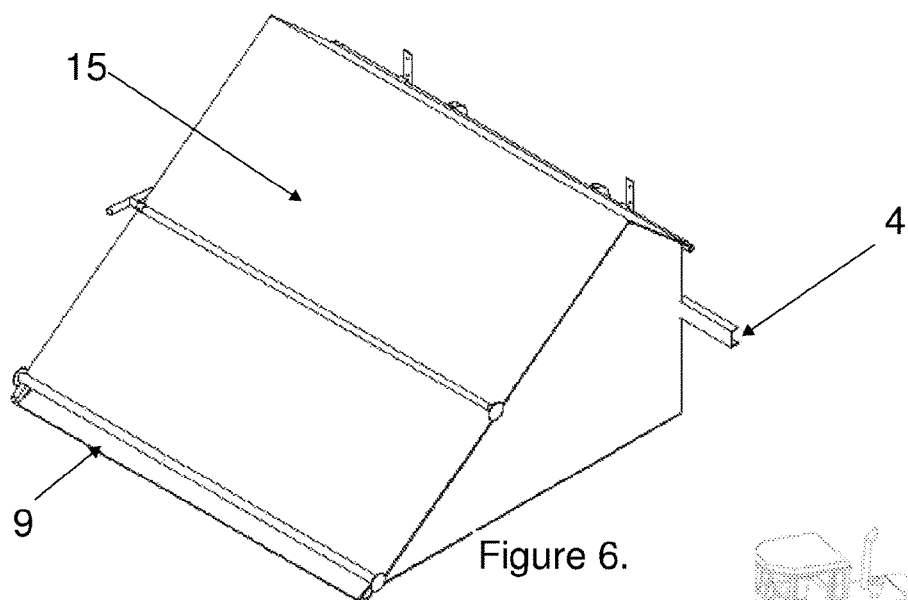
FIG. 6 shows an isometric front view of an L-Bin fitted with a Quarantine Cover as an embodiment of the invention.

FIG. 6 shows the front view of the L-Bin as an embodiment of the present invention comprising with an optional Quarantine cover fitted (15) (4) indicates a bump bar and (9) indicates the containment lip.

Figure 7:
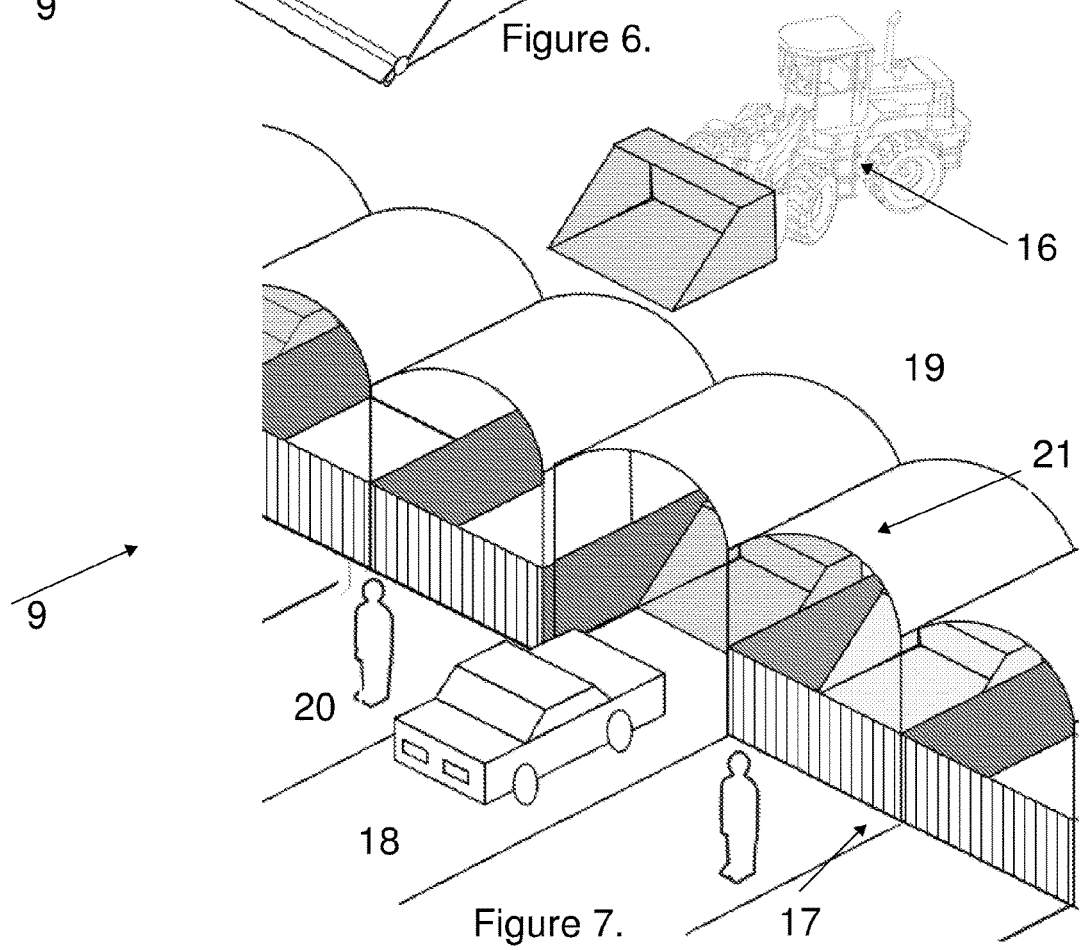
FIG. 7 shows an isometric front view of a MWTS System with Several SheltaBays and L-Bins as an embodiment of the invention.

FIG. 7 shows a system line up of the MWTS. The user area (20) is restricted to users and their vehicles with operators to advise and inspect the loads. The rear area (20) is the machine operating area where machine (16) activities are separated from the user. Retractable Barriers (17) restrict access to bays and thoroughfare to the machine area when a bin is removed. A user Bay (18) is the space provided for a user to gain access to the MWTS bay. This figures shows a roofed MWTS bay (21) referred to in this documents as a SheltaBay. The same arrangement could be provided with bays that have no roof section, such bays are called Bump-Bays.

Options for the Shelta Bay:
1. Self-contained Solar Lighting system.
2. SheltaBay mounted surveillance camera systems.
3. The SheltaBay can be manufactured from a wide range of materials including but not limited to Shade cloth, Waterproof membranes, tarps, steels or any material suitable for creating a roofed structure.
4. Various shapes including but not limited to flat and curved roof areas can be applied.

Benefits of the Modular Transfer Station:

The present invention provides a paradigm shift in how transfer stations work, providing substantially enhanced capabilities in:
(1) Diversion;
(2) Waste Recovery & recycling
(3) Fee Discrimination
(4) Cost
(5) Compliance (Particularly with regard to Problem and Hazardous waste); and
(6) Safety.

Thus, it is an object of the present invention to provide a waste transfer station which provides substantial improvement in each of these areas.

The system according to the present invention addresses many modern transfer station issues some of the benefits of implementing the transfer station solution are listed below.

Diversion:

Increases in environmental levies, fees, incentives and recyclable purchase prices have increased exponentially over time providing a substantial commercial incentive to maximise efforts to recycle and reuse waste material (diversion).

Most existing infrastructure was developed with a view to transferring waste to landfill. WTS infrastructure in the market today is not designed for diversion to the quantum that regulators are demanding. The MWTS of this invention is configured to meet the evolving expectations.

The invention defined in this document is intended as a greenfield or retrofit solution. Recovery is enhanced by the following:

Vastly improved potential for recovery of waste items for resale given the gentler handling of the goods that includes not dropping from height into a pit or bin. Not being pushed around or crushed by machinery.

Users aware of the Lay and display inspection process will be more inclined to separate wastes appropriately on site and will be less inclined to mix, general waste, recyclable and prohibited items.

The operator can flag the bin to be taken away for sorting by trained recovery staff where the expertise of the safety conscious recovery Operators can be used to maximise diversion and minimise cross contamination of recyclables. For example an L-Bin with recoverable furnishings can be directed for sorting for reusable goods that can go to a second hand or reuse shop. A Bin with substantial electronic goods content can be flagged for sorting to "E-Waste".

Sorting and recovery can be done away from the user area reducing down time at the user interface. Allowing more Users to be processed per bay.

The system can be applied to many different types of waste for collection all at one location on a site. This ease of access and control allows for more effective segregation and control of waste.

Cost:

The invention has a very low initial capital cost compared to existing systems, and the capital investment can be staged to match changes in demand and the time to establish is measured in weeks not years.

A potential customer can start off with a relatively small investment and grow their capital cost with actual demand rather than long range demand forecast needed for a fixed plant with a 20+ year life cycle.

The product is available in standard designs and sizes already detailed and engineered so there is no substantive design, engineering and approval process as is the case for existing conventional Bulk Bin and Pit transfer stations. Alternatively, designs can be customised for each site.

The invention can be relocated to other sites or on-sold unlike existing fixed plant solutions.

Design and engineering costs are a fraction of the cost inherent in existing in situ systems.

Time is money and the L-BIN is delivered fully assembled and is operational at delivery. The Modular Bays and SheltaBay require very little site assembly.

The System requires no electricity for the operation of the system unlike hydraulic tipper units and for most transfer stations it also means that power outages will not result in stopping work at the site.

OPEX: The system requires very little maintenance having few moving parts and no hydraulics, motors, or electrics.

Diversion reduces landfill costs.

Compliance:

There are numerous materials that are strictly prohibited or limited by the license of the facility from dumping in landfills or WTS examples of this are: Batteries, Asbestos, Liquid Chemicals, medical waste, Tyres, body parts Etc. The invention process provides for lay and display of waste for review by an operator before the waste is added to the bulk waste stream, so prohibited items can be identified.

Chemicals, oils etc. are prohibited from most landfills. If a user dumps these items in existing transfer stations there are limited mechanisms to contain. In many situations broad based contamination can occur requiring substantial remediation measures. The invention provides for contamination by chemicals to be contained within the L-Bin. The bin open face can be closed by using a Quarantine Cover. The L-Bin can be removed, tilting the bin back aids in guiding the fluids to the back of the bin in the fluid capture area. The Fluids can then be drained directly into a contaminant containment vessel via an outlet provided at the rear of the L-Bin.

If a toxic material is identified eg Asbestos in the L-Bin the specific L-Bin will contain the contaminant, a Quarantine Cover can be added to the open side of the bin and the bin can be removed from the user area and quarantined. A new bin can be put in the user area allowing unimpeded progress of operations.

Given the lay and display available in the L-Bin and the segregation afforded by the modular Bays, Users depositing prohibited material can be easily identified and penalised/prosecuted for the costs or criminality of the deposited waste.

Safety:

The Bays can be manufactured and delivered in modular units for quick and easy installation reducing site construction time and safety issues.

The ability to discretely inspect each load outside of the vehicle allows for better identification or potential risks and hazards that can be managed, contained or quarantined. User side Operators are not required in this system to make contact or aid in unpacking loads in order to effect an inspection as is the case in existing methods.

The flat floor arrangement of the MWTS eliminates fall from height safety issues that exist in saw tooth and pit transfer station designs.

The fluid capture bund in the L-Bin prevents contaminated fluids leaking onto the site. Chemicals can potentially harm people and contaminate local water ways. Because the fluids are captured in the bin broad based site water collection and treatment (as required in conventional WTS) can be avoided.

Bays are delivered pre-assembled with only a few minor connections to be done for each bay. Substantially reducing work hours on each site.

The system reduces manual handling risks for the collection of resalable waste items, as the lay and display allows for a more targeted approach to recovery. Access to resale items can be done on flat ground and not in bulk waste piles or bins or from a user's vehicle.

The inspection operator can direct entire bins to a bulk recycling bin eliminating the need for any manual handling of the bin contents by recovery Operators.

The System separates and site Users (FIG. 7 item 20) from site operational areas and machinery (FIG. 7 items 19 and 16). Recovery Operators are also separated from machine operator areas.

The System reduces risks of machinery squashing liquid containers that could squirt on Users as occurs in existing systems. This is achieved by early identification and isolation of the hazard and separation by area of recovery Operators and Users from locations where machines come into contact with such risks.

The System reduces the potential of machinery running over and exploding expired gas bottles or the like as occurs in existing systems via early detection/Isolation and separation of areas.

The System reduces the risk of timber and steel or the like protruding or being mechanically forced into the user area and causing injury.

The System reduces dust and noise around the user and staff

The System reduces manual handling risks for the collection of resalable waste items and recycling items, due to the selectiveness available from inspection of discreet more manageable parcels of waste.

Quick hitch attachment on the L-Bin allows the operator to stay safe in the Machine cabin.

Key Methods and Features:

1. Safe L-Bin waste receptacle for public waste transfer stations that can be unloaded using machinery including but not limited to a loader or excavator or earthmoving machinery that quickly attaches to the rear of the L-Bin.
2. The L-Bin is attached to the site machinery and can be emptied into waste skip bins, directed to conveyer or other sorting systems or placed in sorting bays for further recycling.
3. The MWTS is designed to safely interface with the public and the machinery which includes a safe placement system with a safety stop on the rear of the L-Bins and guides and stops so the machine operator is prevented from driving the L-Bin to far forward into the public area.
4. The machinery used to move bins is often found at a WTS as they are used to move bulk materials and compact bins for transport and price efficiency.
5. The L-Bin waste receptacles can be coloured and signed to desired waste type or client preference.
6. The L-Bins are used in combination with a safe public interface design using segregated areas for machinery and customers.
7. The total system includes modular bays with optional roofed cover structure, integral safety barriers and integrated safety stops.
8. The bays can be added or removed depending on future demands.
9. The MWTS can be established for temporary or short term applications for example: events, construction projects and mine establishment.
10. The flat floor of the MWTS according to the present invention requires no engineered walls like saw tooth and pit transfer station which are the common systems.

Furthermore, the system according to the present invention:

Allows for transfer station Users to visit one location for recycling, steel, tree waste and general waste as opposed to many locations.

Allows for vetting of loads for non-accepted waste types and recycling delivered by the Users.

Provides savings and is more economic to operate compared to other transfer station systems.

Requires no electricity for the operation of the system unlike tipper units and most transfer stations.

allows for improved resource recovery through the ability to vet/inspect delivered loads thoroughly, May provide improved resource recovery for Users through the provision of a one stop waste and recycling facility provides improved resource recovery by easy direction of full L-Bins to recycling receptacles or safely designed recycling bays reduces manual handling risks for the collection of resalable waste items and recycling items can be combined easily with other modular sorting systems separates site staff and site Users from machinery can be manufactured and delivered in modular units for quick and easy installation and use reduces design costs as the system can be used on any level surface without engineered walls and access ramps to suite Reduces the need to wait for engineer certification or Council permits as it has no engineered walls.

Moreover:

The waste receptacles and bays can be of any width size or height depending on needs The system will allow for tipping vehicles or trailers to tip into the waste L-Bin if desired The L-Bin when placed in the bay allows for waste liquids to stay in the L-Bin or be drained from the rear of the L-Bin into separate storage tanks The system may include a design that redirects clean water away from the waste products The system reduces risks of machinery squashing liquid containers that could squirt on Users as has occurred in other systems The system reduces the potential of machinery running over and exploding expired gas bottles or the like as can happen in waste pits The system reduces the risk of timber and steel or the like protruding or being thrust by machinery into the user area causing injury.

The system reduces dust and noise around the user and staff.

The system reduces machinery failure risks from hydraulic tippers L-Bins

The system requires very little maintenance compared to tipper bins, conveyors, travelling waste systems and conventional transfer stations or the like The system can operate during power outages The modular bays meet engineering certification standards and wind ratings standards Modular Waste Transfer Station (The Invention):

The Modular Waste Transfer Station (MWTS) is safer for both the user and Operators due to the clear segregation of operational activity from user activity by barriers and the extraction of the L-Bins directly from the user area into the restricted Machine operator area. This provides clear segregation of core diversion activities from the user zone. When the L-Bin receptacle is removed from the bay a gate or barrier is closed at the front of the bay restricting user access. When the receptacle is put in position at the front of the bay, the gate is opened and the L-Bin in combination with the stops and guide provide a physical barrier to prevent Users from accessing the machinery area.

This system creates one area for all refuse materials to be deposited, decreasing the time required to deposit refuse and assists attendants with the monitoring of appropriate sorting and disposal.

The modular transfer station allows any combination of the differing types of refuse receptacles to be located in any bay. This allows adaptability on any given day or circumstance this is particularly useful during peak periods.

The use of the MWTS heavily reduces the level of dust created from other systems by the simplicity of the machinery moving the receptacle at ground level and only raising the receptacle when it reaches either the Bulk Bins or sorting areas. This method also assists with the overall cleanliness of the transfer station.

The MWTS is not limited to expansion or reduction. It can easily be moved to another site in part or in full. Or can be established for short term of event applications.

The MWTS can also retrofit to most existing WTS structure with already established engineered walls.

The roofed modular SheltaBay system is designed to divert rain water away from the L-Bin waste receptacle and or provide shelter to Users and Operators.

The SheltaBay is engineered to comply with applicable standards for wind ratings.

The MWTS method allows an operator attending to the Users to monitor refuse disposal and issue a token of fee sheet to Users for the type of waste deposited.

Cost Savings:

The MWTS has no electrics, hydraulics or mechanical systems as a result it is unaffected by power outages that would normally create down time.

Existing staff will not have to be substantially upskilled as there is no technical component required.

Machine quick hitch connections can be provided for a vast array of different equipment including but not limited to: Bobcats, dozers, Excavators, Drotts, Manitou.

The present invention provides a method of managing WTS processing that addressed jointly and severally the 6 major issues for waste transfer stations being:
1) Diversion.
2) Waste Recovery & recycling.
3) Fee discrimination
4) Cost
5) Compliance
6) Safety.

Features & Benefits:

By the application of unique processes and combinations of product solutions the invention has the following features and benefits:

The inventions MWTS by way of system design provides for a minimum of 3 discreet zones for operation and safety.
Zone 1 for the User.
Zone 2 for the Machinery.
Zone 3 for the Diversion Operators.

The 3 discreet zones provide for a much safer human environment. Additional zones can be added that include but not limited to: Transit ways, Quarantine, Contaminated Fluid capture, Recovered goods sales etc.

The process involves the ability to address individual or several aggregated waste deliveries discreetly and to be able to quickly and efficiently remove the delivered waste from the user area in self-contained L-Bin modules.

The machinery typically required to move the L-bins is often used on a landfill site, potentially obviating the need to purchase machinery to operate. Machinery can be used in combination with the robustly built L-Bin to aid compaction of the waste for transport efficiency and landfill volume reduction.

The MWTS system invention can be retrofitted into most existing transfer stations or can be provided in combination with modular SheltaBay and BumpBays as a new standalone transfer station.

The MWTS is relocatable and can be established as a permanent, long or short term solution. It can even be deployed for use at events, remote construction camps, or to support major projects.

The MWTS system has appreciable commercial benefits as a standalone facility as it is scalable from the smallest of transfer stations to the largest. Capital expenditure can be staged and the capital cost is appreciably less than modern covered transfer stations.

A MWTS can be delivered in a fraction of the time, with substantially less design and engineering required compared to existing WTS solutions.

As a supplied product solution a MWTS does not need to be individually designed and constructed for each site.

Lay and display for the purpose of diversion has no value unless the waste materials with a recovery/recycling potential can be collected and delivered easily without, Operators or machinery entering the user area. The MWTS invention process uniquely allows for the material with the lay and display platform to be removed from the user area for diversion after inspection.

Lay and display for the purpose of Fees & Compliance has no value unless the waste materials as delivered can be collected and segregated based on cost of disposal. By way of example if green waste is delivered into a fixed tipper at a Push Pit WTS then charging a lower rate for green waste is irrelevant as the fixed tipper has no choice but to deliver the green waste into the general waste stream. The MWTS invention allows for the actions of disposal/diversion/recovery to be commensurate with the fees.

Diversion is aided by the correct direction of L-Bins by qualified Operators who are, with the MWTS invention able to direct the Machine operator to take the L-Bin to the correct bulk bin, recovery/recycling Operators or quarantine areas.

The MWTS has a signalling system an optional part of the invention that allows the operator inspecting to signal to the machine operator the type of waste that has been deposited in a particular bin even though the machine operator has no visibility of the load. One such method as illustrated on the figures (FIG. 4 item 12) in the use of different coloured/marked flags.

Waste is collected in but not limited to a flat bottom open faced receptacle or bin ("L-Bin" being a product of the system) that can be:

(1) Inspected readily by "lay and display" presentation of waste to an operator, for fees, Diversion and prohibited materials identification.

(2) The receptacle can be removed from the user area without crossing or entering the user area for the purpose of:

The MWTS allows for depositing in the Bulk Waste Stream, without waste manual handling by operators.

The MWTS allows for depositing contained loads directly into a Recyclable storage area, without waste manual handling by operators.

The MWTS allows for green waste to be depositing in a composting pile shredder, chipper or similar apparatus without waste manual handling by operators The MWTS allows a bin to be relocated with its contents to a separate Reuse and recovery sorting area for trained Operators to segregate identified diversion materials.

The MWTS allows the placement of a bin complete with contents in a segregated quarantine area to review and treat prohibited material contamination.

The speedy removal of the bin from the user area is aided by the provision of quick hitch attachments to the rear of the MWTS bin that can be customised to operator's available machinery. (FIGS. 2 & 4 Item 14) Quick hitch attachments can be provided for but not limited to the following types of machinery: Wheel & Skid steer Loaders, Excavators, Back Hoes, Manitou, etc. Quick hitches are also beneficial as there is no requirement for the operator to get out of his cabin to do any operations in the machine zone of the WTS.

The flat bottom open faced L-Bin provides for a much safer user experience as the need to lift waste over a bin lip, guard rail or other similar measures as exit in the status quo is not required. Tripping hazards are minimised.

Managing chemicals is a feature of the L-Bin, if a chemical container ruptures in an L-Bin its contents are substantially contained within the bin footprint by way of a bund within created by the fluid retention lip (FIGS. 4 & 6 item 9) and flat floor with fluid capture (FIG. 4 item 10). The L Bin can be fitted with a hinged finger gate (FIG. 4 item 11), that will aid the separation of chemicals from other waste in the bin. The bin can be removed from the user area tipped backwards by the machine to have the liquids aggregate at the back of the bin. The liquids can then be drained specifically into a waste fluid containment vessel via a hose and tap available for the rear of the L-Bin (FIG. 5 item 13).

Another elements of the System including the "Bays" and "SheltaBays" that combine with the L-Bin as part of the system to deliver the following benefits:

1. Provision of stops (FIGS. 2, 3 & 6 item 4) on the L-Bin and physical barriers as part of the bay to prevent a user entering the machine or Diversion operator Zones.
2. Modular Bays are available as unitised assembled modules or kits. They can be easily offloaded, relocated and installed. Their simple standard design reduces site work, and delivery time providing reduced cost and potential for injury during site construction. (FIG. 1)
3. Provide substantive physical separation between Users, and between L-Bin loaded and unloaded bays for Users and Operators.
4. Bays and Modular bays are provided with operator managed barriers (FIG. 3, item 8) to prevent Users from entering a bay that is not loaded with an L-Bin.
5. Modular BumpBays and SheltaBays are designed to work in collaboration with the stops and guides of the L-Bin to ensure that the Bin is correctly located in the bays without risk to Users.

Glossary of Terms

The following terms and acronyms have been used in this document. The definitions provided below are typical but not exclusive representations of these terms:

WTS: Waste Transfer Station.
MWTS: Modular Waste Transfer station. This invention.
L-Bin: Open faced bin as described in this document, part of this invention.

Bay: The area designated for a client to access for the purpose of delivering waste.

BumpBay: An compound to surround the landing location for a L-Bin inclusive of safety barriers and guides but without a roof, part of this invention.

SheltaBay: A BumpBay fitted with a roof, part of this invention.

Operators: Personnel working at a WTS.

Machine Operators: Operators at a WTS that are charged to operate machinery, this can include Loaders, excavators, dozers etc.

Quarantine Cover: (FIG. 6, item 15) A custom designed and manufactured cover for the open face of the L-Bin that allows the bin to be closed to contain contaminates, part of this invention.

Users: Are people other than Operators that are bringing waste material to the site.

Lay & Display: is the process or presenting waste loads outside of the delivery vehicle for the purpose of inspection or review.

Bulk Bin: Is a large commercial bin where numerous user waste deliveries are combined for onward transfer.

Landfill: A landfill is also known as a tip, dump, rubbish dump or dumping ground and historically as a midden. It is a site for the disposal of waste materials by burial and is the oldest form of waste treatment.

Bulk Waste Stream: Where numerous user waste deliveries are brought together for onward transfer. Examples are Bulk Bin's, Waste Pits, piles or mounds of rubbish.

Recycling: is a process to change waste materials into new products to prevent waste of potentially useful materials, reduce the consumption of fresh raw materials, reduce energy usage, reduce air pollution (from incineration) and water pollution (from landfilling) by reducing the need for "conventional" waste disposal, and lower greenhouse gas emissions as compared to plastic production.

Diversion: Waste diversion is the process of diverting waste from landfills this is typically done by recycling and reusing. This includes composting of Green waste.

Waste: Any material that is excess or surplus to requirements. This can include Municipal solid waste (MSW), commonly known as trash or garbage (US), refuse or rubbish (UK) is a waste type consisting of everyday items that are discarded.

Waste Types: Waste can be classified in several ways but the following list represents a typical classification:

Biodegradable waste: food and kitchen waste, green waste, paper (can also be recycled).

Recyclable material: paper, glass, bottles, cans, metals, certain plastics, fabrics, clothes, batteries etc.

Inert waste: construction and demolition waste, dirt, rocks, debris.

Electrical and electronic waste (E-Waste)—electrical appliances, TVs, computers, screens, etc.

Composite wastes: waste clothing, Tetra Packs, waste plastics such as toys.

Hazardous waste including Asbestos, most paints, chemicals, light bulbs, fluorescent tubes, spray cans, fertilizer and containers Problem waste such as: Tyres & Mattresses, Toxic waste including pesticide, herbicides, fungicides, Medical waste.

LEGENDS TO FIGURES

1. Flat pad
2. Bin
3. Modular bay
4. Limiters/stops/guides
5. Bump Stop
6. Spill and waste capture member
7. Spill and water drain
8. Barrier at front of bay.
9. Fluid retention lip
10. Flat floor with fluid capture reservoir
11. Hinged finger gate
12. Flag
13. Liquid drain pipe and tap
14. Quick hitch connection point
15. Quarantine Cover
16. Machine for moving L-Bin
17. Retractable bay Barrier
18. Bay
19. Machine Operation Zone
20. User Zone
21. SheltaBay While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A method for the safe operation of waste transfer stations operated by waste transfer station recovery personnel where a delivered load of waste can be laid out, inspected and redirected for disposal or diversion before entering a bulk waste stream, where said bulk waste stream is defined where two or more sources of material are combined, the method comprising the steps of:

(i) laying out or displaying a delivered load of waste on a waste transfer station floor by;

(a) providing multiple relocatable bins, at least some of said bins comprising a floor, rear wall and side walls sufficient to contain the delivered load without the waste, or waste liquids being able to make contact with the waste transfer station site floor;

(b) providing machinery at a rear of said bins including, but not limited to loaders, dozers, telehandlers and excavators, so that said bins can be picked up, a quick pick up connection for said machinery, such that said machinery may be relocated quickly and emptied efficiently by operators of said machinery, without exiting said machinery;

(c) wherein said waste transfer station has a user zone and said bins are designed and intended for users bringing waste to said user zone of said waste transfer station or said waste station recovery personnel to work within said bins;

(d) providing at least some of said bins with an open front face to provide easy and safe access to allow said users or said waste transfer station recovery personnel to enter said bins without a gate, door or trip hazard in order to lay out waste;

(e) providing at least some of said bins with an optional quick attaching closure for said open front face of said bins to allow the contents to be quarantined/contained;

(f) providing a barrier bay and providing at least some of said bins with impact absorbing stops that guide the accurate placement of said bins inside said bay with safety barriers;

(g) providing at least some of said bins with a substantially flat to ground step free bin base, to lay out waste with limited trip hazards;

(h) providing multiple barrier bays, said multiple bins being situated in said barrier bays and arranged consecutively side by side to allow segregation of said users in individual adjacent or consecutive bays and bins;

(i) wherein the arrangement said bins in said consecutive bays forms a barrier between said users and said machinery, and said barrier arrangement has said users in front of said bins and said machinery to the rear;

(j) providing at least some of said bins with a bin reservoir for containing chemicals or leachate, and a means for accurately releasing said chemicals or leachate from said bin reservoir into a designated containment vessel; wherein leachate entering the ground water system of the site is mitigated by the system;

(ii) containing the delivered load of waste in said bins to allow the contents to be reviewed for the purpose of identifying materials for recycling or reuse;

(iii) inspecting the delivered load of waste in said bin for potential hazardous, or prohibited items where a party delivering the material can be identified and hazardous material prevented from mixing with and or contaminating the bulk waste stream or site;

(iv) physically separating said users, said machinery and said waste transfer station recovery personnel from each other at all times for improved safety;

(v) further providing a user zone, wherein a discrete load of waste may be removed from said user zone without said waste transfer station recovery personnel needing to transfer the load to another conveyance, or manually or mechanically removing the waste from said bins in said user zone;

(vi) closing bins containing a discrete load that has hazardous material to limit exposure to such hazardous material such that such bins can be removed from said user zone with the hazardous material contained;

(vii) relocating some of said bins with contained waste directly to the bulk waste stream without sorting, thereby reducing the volume of waste requiring sorting;

(vii) selecting/nominating a bin containing waste therein and relocating said selected/nominated bin away from said user zone to a sorting area where only the material to be recovered is extracted by waste transfer station recovery personnel who work in said sorting zone away from the said user zone; and (ix) wherein said discrete load contained in said bins includes said chemicals; and further providing a chemical containment reservoir to reduce chemicals from contacting said waste transfer station site floor, (x) minimising the amount of waste contaminated water or leachate and said chemicals making contact with said waste transfer station site floor, where at least some of said bins can capture and then drain said chemicals into said chemical containment reservoir.

2. A method for the operation of a waste transfer station operated by waste transfer station recovery personnel where waste can be laid out, inspected and redirected for disposal or diversion or quarantine before entering a bulk waste stream, comprising the steps of:

(i) providing multiple bins for laying out or displaying parcels of delivered waste for review and inspection, where the contents of said bins are separated from the waste transfer station site floor and all other waste;

wherein at least some of said bins:

(i) comprise an open front face to provide easy and safe access to allow users bringing waste to the transfer station or operators of the transfer station to enter said bins without a gate, door or trip hazard in order to lay out or access waste;

(ii) are designed and intended for said users or said waste transfer station recovery personnel to work within the bin;

(iii) comprise a floor, rear wall and side walls sufficient to contain the delivered load without the waste, or waste liquids, being able to make contact with said waste transfer station site floor, (iv) comprise a quick pick up connection for machinery at a rear of said bin particularly but not limited to for loaders, dozers, telehandlers and excavators so that said bin can be picked up, relocated quickly and emptied efficiently by an operator of said machinery without exiting the machinery;

(v) comprise an optional quick attaching closure for the open front face to allow the contents to be quarantined/contained;

(vi) comprise impact absorbing stops that guide the accurate placement of said bin inside a bay with safety barriers;

(vii) comprise a substantially flat to ground step free bin base, to lay out waste with limited trip hazards;

(viii) providing barrier bays within which said bins are arranged consecutively side by side in a modular arrangement to allow segregation of users in individual adjacent or consecutive bays and bins;

wherein the arrangement of said bins in consecutive bays forms a barrier between said users and said machinery and said barrier arrangement has said users in front of said bins and said machinery to said rear of said bins;

(ix) further comprising a bin reservoir associated with each of said bins;

(x) wherein said bins are capable of accurately releasing the chemicals or leachate from said bin reservoir into a designated containment vessel; and wherein leachate entering the ground water system of the site is mitigated by the system;

(ii) relocating said bins complete with waste for sorting, or directing to bulk waste by waste type;

(iii) isolating/quarantining waste such as hazardous waste identified in said bins from the bulk waste stream to prevent contamination by removing the bin with hazardous waste;

(iv) reviewing and sorting for diversion by the ability to review a discrete quantity of displayed waste before it is mixed with bulk waste;

(v) sorting waste for diversion of recoverable or reusable waste is conducted out of a user zone, in order to diminish the potential for harm to said users, said machinery operators and said waster station transfer recovery personnel who otherwise would need to work in the said user zone; and (vi) minimising waste contaminated water or leachate from making contact with a waste transfer facility ground water system capable of diverting or capturing, said leachate and chemicals, said method further comprising:

placing said bins in an arrangement to allow segregation of waste and recyclable material in individual adjacent or consecutive bays;

providing at least one bin without a front face or step that provides for management of chemicals and leachate;

(i) providing a fluid capture area to the base of said at least one bin;

(ii) providing a reservoir area in said at least one bin that has barriers that reduce the amount of solid waste entering the bulk waste stream;

(iii) directing chemicals and leachate from said reservoir area of said at least one bin into said bulk waste stream; and (iv) wherein said chemicals or leachate are accurately released from said at least one bin into a designated containment vessel; and providing individual adjacent or consecutive bays, wherein said bins are placed in an arrangement to allow segregation of waste and recyclable material in said individual adjacent or consecutive bays.

3. The method according to claim 1 comprising:

(i) eliminating the need for said machinery to enter said user zone and providing physical separation barriers between said users and said machinery;

(ii) providing physical separation barriers between said machinery and said user zone eliminating the need for said machinery operators and said waste station recovery personnel to access s id user zone in order to recover reusable or recyclable materials;

(iii) preventing said machinery operators from pushing a bin into said user zone;

(iv) preventing the need for transfer vehicles and material handling equipment to enter said user zone to collect said reusable or recyclable material;

(v) ensuring all user delivery/unloading, machine operation activities and sorting to be conducted on the same ground level, thereby mitigating the risk of falls from height;

(vi) restricting access for said users into a bay without a bin in place; and (vii) providing bays and physical barriers between said bays to limit said user's ability to do harm into adjacent bays/users.

4. The method according to claim 1 wherein said bins are:

(i) easily relocated;

(ii) added or subtracted to meet changes in demand; and (iii) can be deployed temporarily or permanently.

* * * * *